United States Patent
Wang et al.

(10) Patent No.: US 6,692,397 B2
(45) Date of Patent: Feb. 17, 2004

(54) CLEARANCE TAKE-UP JOINT FOR AN ADJUSTABLE MECHANISM

(76) Inventors: Lien-Lin Wang, No. 207, Kuan Yuan N. Rd., Tainan (TW); Liang-Hsiung Wang, No. 207, Kuan Yuan N. Rd., Tainan (TW)

( * ) Notice: Subject to any disclaimer, the term of this patent is extended or adjusted under 35 U.S.C. 154(b) by 0 days.

(21) Appl. No.: 10/252,048

(22) Filed: Sep. 23, 2002

(65) Prior Publication Data

US 2003/0060317 A1 Mar. 27, 2003

(30) Foreign Application Priority Data

Sep. 26, 2001 (TW) ...................................... 90216458 U

(51) Int. Cl.7 ................................................. F16H 1/32
(52) U.S. Cl. ...................................... 475/162; 297/362
(58) Field of Search ................................ 475/162, 175; 297/362

(56) References Cited

U.S. PATENT DOCUMENTS

| | | | | |
|---|---|---|---|---|
| 4,407,544 A | * | 10/1983 | Bahring | 297/362 |
| 4,943,116 A | * | 7/1990 | Ohwada et al. | 297/362 |
| 5,154,475 A | * | 10/1992 | Kafitz | 297/362 |
| 5,277,672 A | * | 1/1994 | Droulon et al. | 475/176 |
| 5,308,294 A | * | 5/1994 | Wittig et al. | 475/162 |
| 5,536,217 A | * | 7/1996 | Droulon et al. | 475/177 |
| 5,634,689 A | * | 6/1997 | Putsch et al. | 297/362 |
| 5,871,414 A | * | 2/1999 | Voss et al. | 475/175 |
| 6,076,889 A | * | 6/2000 | Su et al. | 297/362 |
| 6,390,556 B1 | * | 5/2002 | Moradell | 297/362 |
| 6,579,203 B2 | * | 6/2003 | Wang et al. | 475/162 |
| 6,619,743 B1 | * | 9/2003 | Scholz et al. | 297/362 |

* cited by examiner

Primary Examiner—Rodney H. Bonck
Assistant Examiner—David D. Le
(74) Attorney, Agent, or Firm—Troxell Law Office PLLC

(57) ABSTRACT

A joint has a first leaf having an inner gear and a second leaf having an external gear meshing with the inner gear. A stub with a wedge-shaped outer periphery is formed on the first leaf. A driving member is non-rotatably attached to a shaft and rotatably received between the leaves. A supporting base is mounted between the leaves and is actuated by the driving member. At least one driven wedge-shaped segment is mounted around the stub. Each segment has an inner wedge-shaped surface to mate with the outer wedge-shaped outer periphery of stub. A wedge arrangement is arranged between the supporting base and each segment to raise the segment as the driving member is rotated with the shaft. Accordingly, the angle between the leaves can be adjusted, and the shaking of the second leaf with respect to the first leaf can be prevented.

8 Claims, 5 Drawing Sheets

CLEARANCE TAKE-UP JOINT FOR AN ADJUSTABLE MECHANISM

BACKGROUND OF THE INVENTION

1. Field of the Invention

The present invention relates to a joint, and more particularly to a clearance take-up joint for an adjustable mechanism and which can prevent any possible shaking between two parts of the adjustable mechanism.

2. Description of Related Art

Clearance take-up joints are used with seatback adjustment mechanisms, seat height adjustment mechanisms and power windows to eliminate the clearance between gear assemblies. With reference to FIGS. 5 and 6, a conventional clearance take-up joint in accordance with the prior art comprises a stationary gear plate (60), a rotary gear plate (70), a gear coupler (80) and two discs (82). The joint is particularly suited for use with a seatback adjustment mechanism. Each gear plate (60,70) has teeth (61, 71) formed on the inner periphery of the gear plate (60,70). The rotary gear plate (70) is supported by a bearing race (73), with multiple ball bearings (72) mounted between the gear plate (70) and the bearing race (73).

The gear coupler (80) has two sets of teeth (not numbered) formed on the outer periphery of the gear coupler to respectively mesh with the teeth (61,71) of the gear plates (60, 70). A central bore (81) is defined in the gear coupler (80) to mount the pair of discs (82).

Each disc (82) has a central hole (821) through which a shaft (90) is installed. A hollow notch (822) is formed at the lower portion of the central hole (821) in each disk (82). An arcuate window (823) is formed in each disk (82) to collectively hold a resilient member (83) that presses one of the discs (82) to the right and the other of the discs (82) to the left. In addition, the shaft (90) has a lug (91) that extends into the hollow notches (822) in the two discs (82).

When the shaft (90) is stationary, the discs (82) will be pushed by the force provided by the resilient member (83) to be offset to each other and to abut the inner surface of central bore (81) in the gear coupler (80). Some teeth on the gear coupler (80) will mesh with the teeth (61, 71) in the gear plates (60,70). Consequently, the gear plates (60, 70) will not rotate relative to each other due to the engagement of the teeth (61, 71) of the gear plates (60, 70) and the gear coupler (80). The inclination of the seatback relative to the seat is fixed.

When the shaft (90) is turned, the lug (91) on the shaft (90) will push the hollow notch (822) in one of the discs (82) to rotate to overlap with the other disc (82) more. Consequently, a gap will be defined between the inner surface of the central bore (81) of the gear coupler (80) and the discs (82). A clearance will occur for the teeth on the gear coupler (80) to release from the teeth (61, 71) in the gear plates (60, 70). Consequently, the rotary gear plate (70) can freely rotate relative to the stationary gear (60). The inclination of the seatback can be adjusted.

From the foregoing, it is clear that this conventional joint has the disadvantage of the existence of friction between the discs (82) themselves and between the discs (82) and the gear plates (60,70). If the friction is larger than the force produced by the resilient member (83) that outspreads the gear plates (60,70), excessive clearance will occur between the meshing teeth of the gear coupler (80) and the teeth (61, 71) of the gear plates (60,70). Therefore, the seatback may shake with respect to the seat. In addition, due to the friction between the discs (82), a large force is needed to rotate the shaft (90) to actuate the discs (82) to move.

Furthermore, because the resilient member (83) is arranged in the arcuate windows (823) in the discs (82), two ends of the resilient member (83) are respectively located at different longitudinal levels. To install the resilient member (83) in the discs (82) is difficult. In addition, the resilient member (83) will deform irregularly, and the resilient member's (83) elasticity will be lost in a short time. The resilient member (83) cannot provide an enough outspreading or expanding force to the discs (82), and a gap will be generated between the gear coupler (80) and the teeth (61,71) of gear plate (60,70). The seatback easily shakes with respect to the seat.

To overcome the shortcomings, the present invention tends to provide an improved clearance take-up joint to mitigate or obviate the aforementioned problems.

SUMMARY OF THE INVENTION

The main objective of the invention is to provide an improved joint for adjusting the inclination of a seatback, which can prevent any shaking of the seatback with respect to the seat. The clearance take-up joint has a first leaf, a second leaf, a driving member and two driven wedge-shaped segments. A stub with a wedge-shaped outer periphery is formed on the first leaf. The driving member is non-rotatably attached to a shaft and rotatably received between the leaves. A supporting base is mounted between the leaves and is actuated by the driving member. The driven wedge-shaped segments are mounted around the stub. A wedge arrangement is formed between the supporting base and each segment to raise the segment as the driving wedge-shaped disk is rotated with a shaft. Therefore, each segment is moved in the axial direction along the wedge-shaped outer periphery on the stub by means of the wedge arrangement between the supporting base and the segment. Sufficient clearance will occur between the meshing teeth of the gears so as to unlock the second leaf from the first leaf, which ensures the smooth rotation of the second leaf with respect to the first leaf. The angle between the second leaf and the first leaf can be adjusted.

Other objects, advantages and novel features of the invention will become more apparent from the following detailed description when taken in conjunction with the accompanying drawings.

DETAILED DESCRIPTION OF PREFERRED EMBODIMENT

Figure 1:
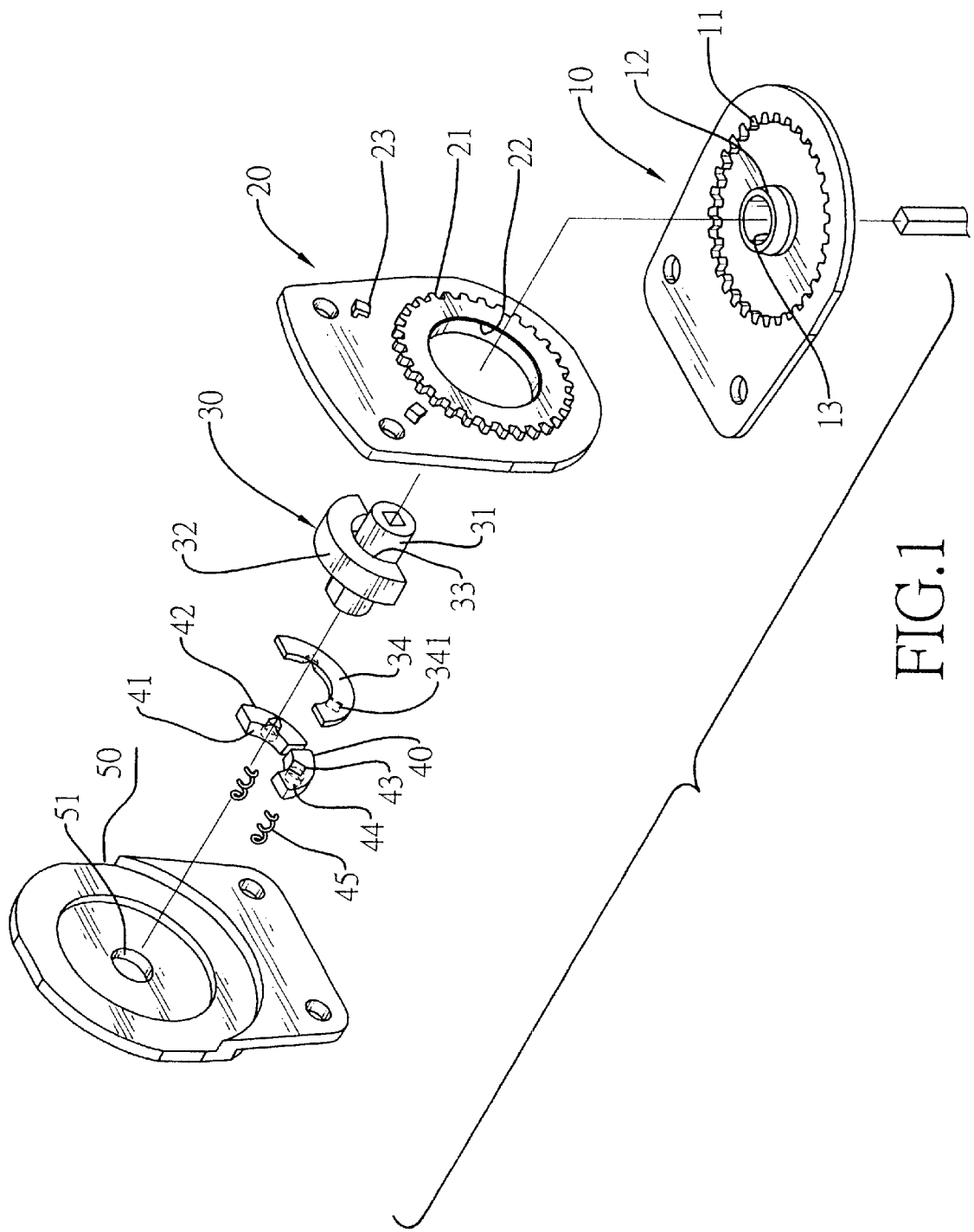
FIG. 1 is an exploded perspective view of a first preferred embodiment of a joint in accordance with the present invention for an adjustable mechanism.
Figure 3:
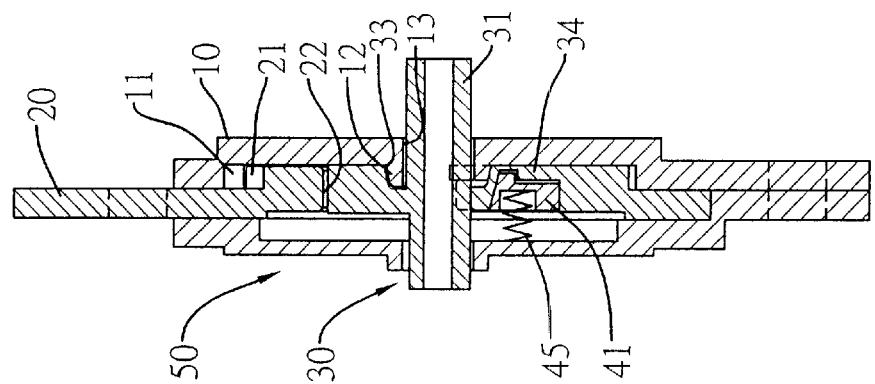
FIG. 3 is a side plan view in partial section of the joint in FIG. 1.
Figure 2:
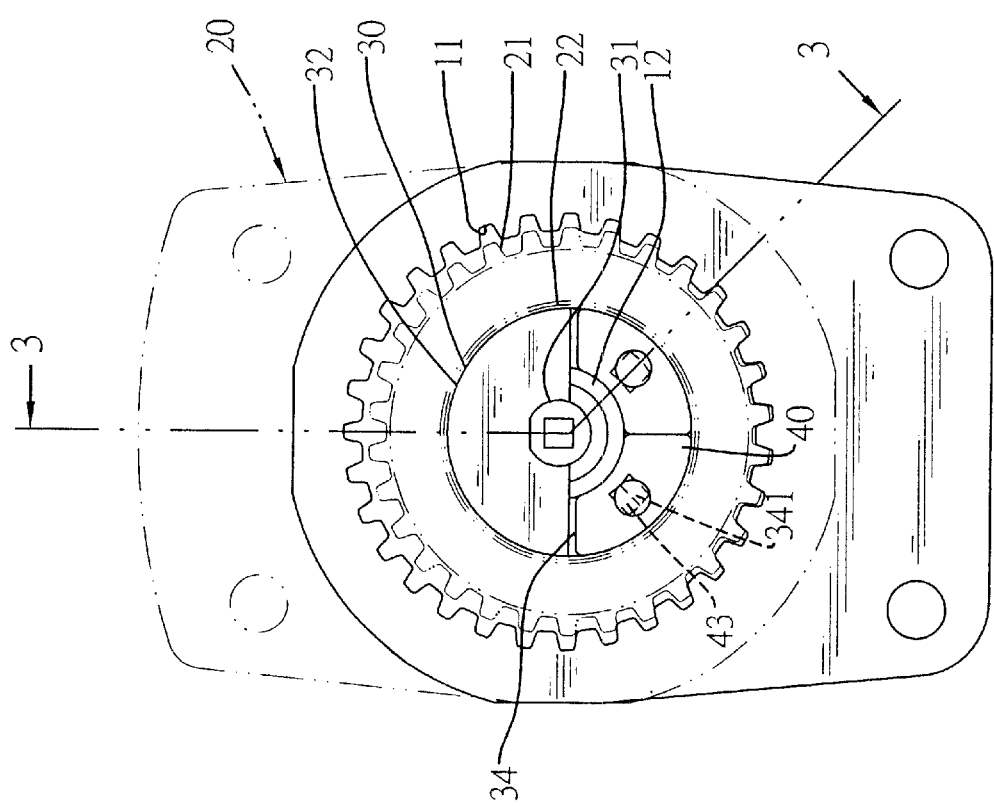
FIG. 2 is a plan view in partial section of the joint in FIG. 1.

With reference to FIGS. 1 to 3, a clearance take-up joint in accordance with the present invention comprises a first leaf (10), a second leaf (20), a driving member (30), at least one driven wedge-shaped segment (40) and a cap (50). The joint is used to adjust the inclination of two parts of an adjustable mechanism, such as a seatback with respect to an automobile seat of an adjustable seat. One end of the first leaf is formed with a round end. An inner gear (11) is formed in the first leaf (10). An external gear (21) with an outer diameter smaller than an inner diameter of the inner gear (11) of the first leaf (10) is formed on the second leaf (20), such that the external gear (21) can mesh with the inner gear (11). A stub (12) with a wedge-shape outer periphery is formed on the first leaf (10) at the center of the inner gear (11). An axial hole (13) is defined through the stub (12).

A central hole (22) is defined in the second leaf (20), and the external gear (21) is formed concentrically around the central hole (22). The cap (50) is fixed to the first leaf (10) such that the second leaf (20) is positioned between first leaf (10) and cap (50). An aperture (not numbered) is defined in the cap (50) and aligns with the central hole (22) in the second leaf (20) and the axial hole (13) in the first leaf (10). Two hooks (23) are formed on the second leaf (20) to hook the round end of the first leaf (10) so as to improve the abutment between the leaves (10,20).

The driving member (30) is received in the central hole (22) in the second leaf (20). The driving member (30) has an actuating block (32) and a central axle (31). The central axle (31) extends from the actuating block (32) to serve as a center of the actuating block (32). The central axle (31) penetrates through the central hole (22) in the second leaf and the axial hole (13) in the first leaf. A recess (33) is defined in the actuating block (32) at a side facing the first leaf (10) to receive the free end of the stub (12) on the first leaf (10). A non-circular hole (not numbered) is defined through the central axle (31).

A supporting base (34) with a thickness less than that of the actuating block (32) is received in the central hole (22) in the second leaf (20) and has two ends respectively corresponding to two ends of the actuating block (32). At lest one wedge-shaped recess (341) is defined in the supporting base (34). In practice, the supporting base (34) can be integrally formed on the actuating block (32).

At lest one driven wedge-shaped segment (40) is mounted around the central axle (31). Each driven wedge-shaped segment (40) has an inner wedge-shaped surface (41) and an outer periphery (42). The inner wedge-shaped surface (41) of each segment (40) mates with the wedge-shaped outer periphery of the stub (12) on the first leaf (10). The outer periphery (42) of each segment (40) abuts against the inner surface of the central hole (22) in the second leaf (20). Consequently, the driven wedge-shaped segments (40) are engaged between the inner surface of the central hole (22) in the second leaf (20) and wedge-shaped outer periphery of the stub (12) on the first leaf (10). At least one wedge portion (43) is formed on each segment (40) to correspond to one of the wedge-shaped recesses (341) on the supporting base (34), such that a wedge arrangement is arranged between each segment (40) and the supporting base (34).

In another embodiment, at least one wedge-shaped recess (341) is defined in each driven wedge-shaped segment (40), and a corresponding wedge portion (43) is formed on the supporting base (34). With such a wedge arrangement between the supporting base (34) and each driven wedge-shaped segment (40), each segment (40) will be moved along the axial direction of the stub (12) while the driving member (30) rotates.

A resilient member (45) is mounted between the cap (50) and each driven wedge-shaped segment (40) to provide a pushing force on the segment (40). In practice, the resilient member (45) is a spring. A recess (44) is defined in each segment (40) to receive one end of the spring.

In operation, if the user wants to change the angle between the seatback and the seat, a shaft (not numbered) penetrating through the non-circular hole in the central axle (31) is rotated first. The driving member (30) is rotated with the shaft, and the supporting base (34) is pushed by the actuating block (32) to rotate with the actuating block (32). Accordingly, the inner surfaces of the wedge-shaped recesses (341) on the supporting base (34) will push against the corresponding wedge portions (43) on the driven wedge-shaped segments (40). Thus each segment (40) is moved in the axial direction along the wedge-shaped outer periphery of the stub (12) by means of the wedge arrangement between the supporting base (34) and the segment (40). When each driven wedge-shaped segment (40) moves away from the supporting base (34), there will be a space for the segment (40) radially moving relative to the inner surface of the central hole (22) in the second leaf (20) and the wedge-shaped outer periphery of the stub (12) on the first leaf (10). The outer periphery (42) of each segment (40) will leave the location abutting the inner surface of the central hole (22) in the second leaf (20). Accordingly, sufficient clearance will occur between the meshing teeth of the gears (11,21) so as to unlock the second leaf (20) from the first leaf (10). This ensures the smooth rotation of the external gears (21) of the second leaf (20) with respect to the inner gear (11) of the first leaf (10). The angle between the second leaf (20) and the first leaf (10) can be adjusted.

The rotation of the shaft is stopped when the leaves (10,20) are adjusted to a desired angle. The segments (40) are engaged with the inner surface of central hole (22) and the wedge-shaped outer periphery of the stub (12) again under the action of the compressed resilient member (45). Therefore, the external gear (21) of the second leaf (20) is pushed outwardly to mesh with the inner gear (11) of the first leaf (10). Accordingly, the external gear (21) will tightly and steady engage with the inner gear (11) without a gap between the meshing teeth of the gears (11,12). This prevents any possible shaking of the second leaf (20) with respect to the first leaf (10).

In addition, when clearance occurs between the two gears (11,21) due to the gear wear after a long time of use, the resilient members (45) will push the driven wedge-shaped segments (40) to move closely relative to the supporting base (34). This can compensate the clearance between two gears (11,21).

Figure 4:
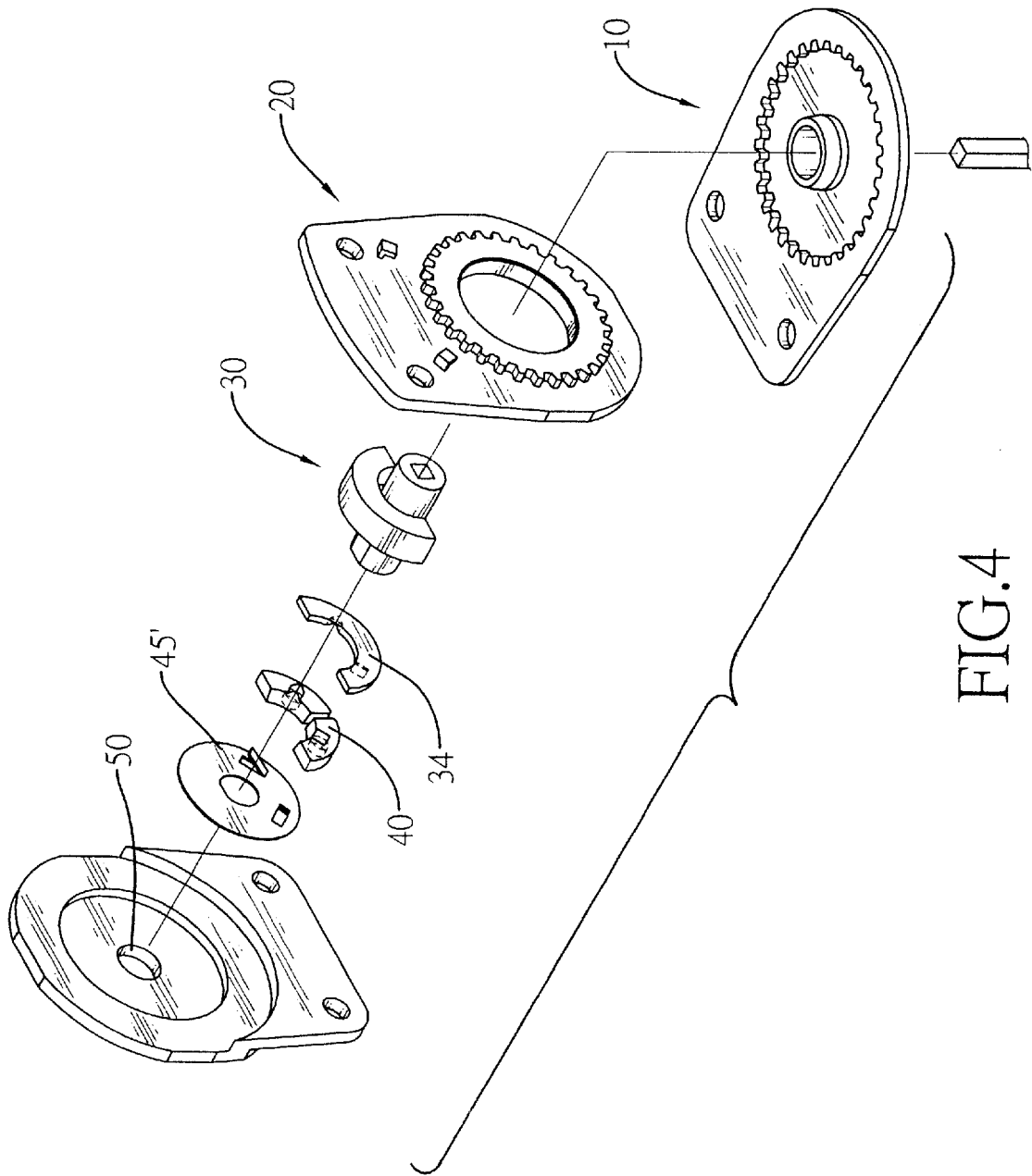
FIG. 4 is an exploded perspective view of a second preferred embodiment of a joint in accordance with the present invention for an adjustable mechanism.
Figure 5:
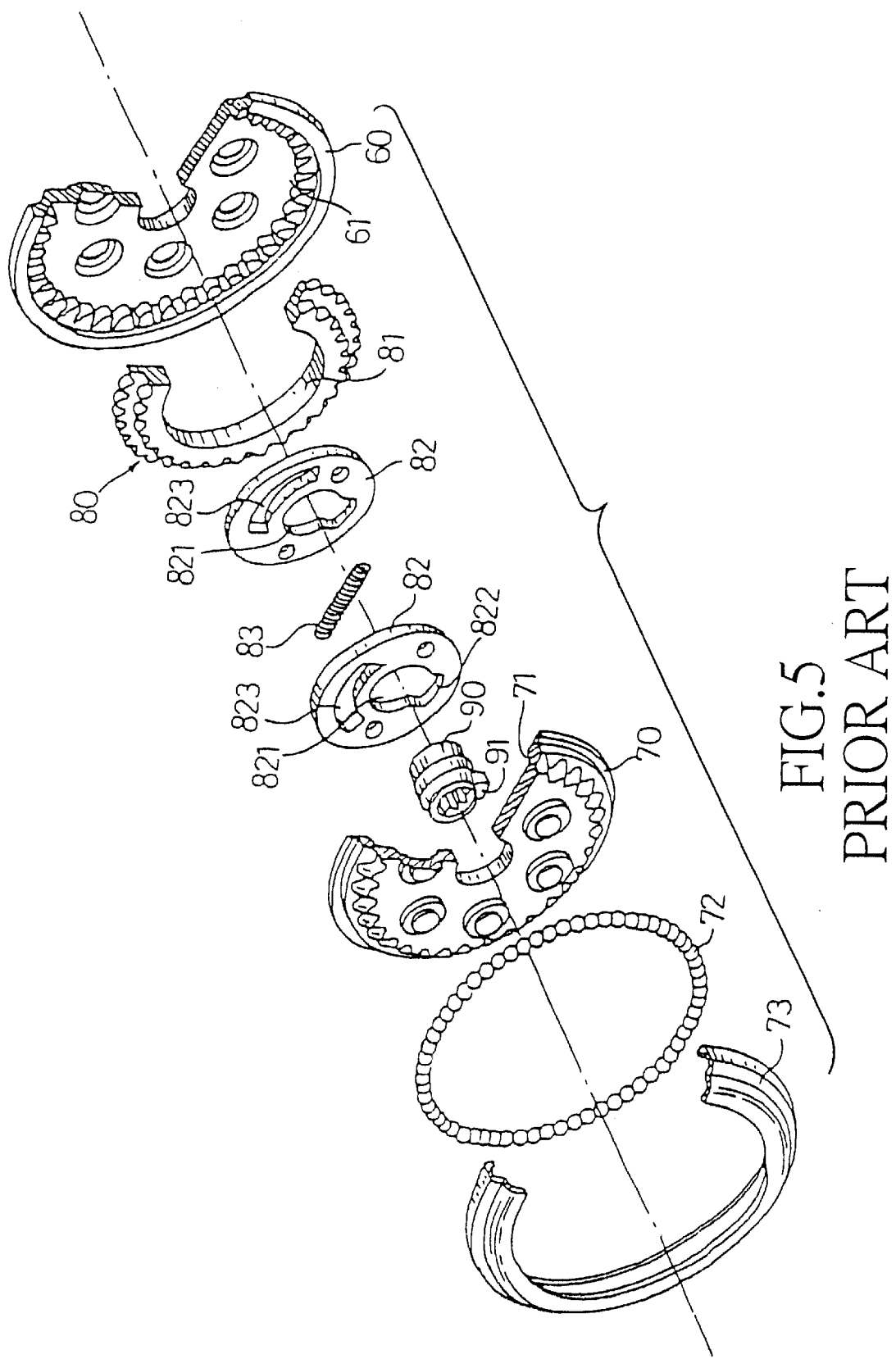
FIG. 5 is an exploded perspective view of a conventional joint for an adjustable mechanism.
Figure 6:
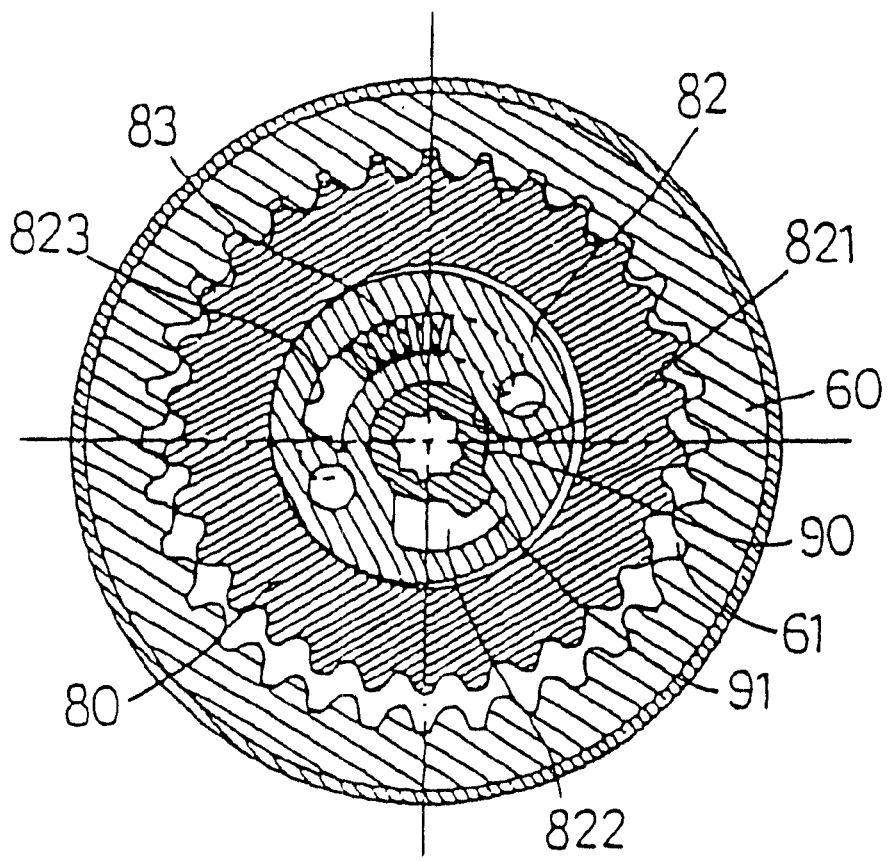
FIG. 6 is a cross-sectional side plan view of the conventional joint in FIG. 5.

With reference to FIG. 4, the resilient member (45') pressing each segment (40) is a resilient tab integrally formed on a disk.

From the foregoing description, the invention has the advantage of preventing any possible shaking between two parts of an adjustable mechanism.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clearance take-up joint comprising:
   a first leaf having an inner gear with a center, a stub with
      a wedge-shape outer periphery formed on the first leaf at the center of the inner gear and an axial hole defined through the stub;

a second leaf having a central hole with an inner surface defined in the second leaf and an external gear meshing with the inner gear in the first leaf;

a cap securely attached to the first leaf;

a driving member mounted in the central hole in the second leaf and adapted to be non-rotatably attached a shaft;

a supporting base received in the central hole in the second leaf;

at least one driven wedge-shaped segment mounted around the stub on the first leaf and supported on the supporting base, each at least one driven wedge-shaped segment having an inner wedge-shaped surface mating with the wedge-shaped outer periphery of the stub on the first leaf and an outer periphery abutting against the inner surface of the central hole in the second leaf;

a wedge arrangement arranged between the supporting base and each at least one driven wedge-shaped segment; and a resilient member arranged between the cap and each at least one driven wedge-shaped segment.

2. The joint as claimed in claim 1, wherein the wedge arrangement has at least one wedge portion formed on each at least one driven wedge-shaped segment; and a wedge-shaped recess defined in the supporting base and corresponding to respective each of the at least one wedge portion on each of the at least one driven wedge-shaped segment.

3. The joint as claimed in claim 1, wherein the resilient member is a spring; and a recess is defined in each at least one driven wedge-shaped segment to receive one end of a spring.

4. The joint as claimed in claim 1, wherein the resilient member is a resilient tab integrally formed on a disk.

5. The joint as claimed in claim 1, wherein the first leaf has a round end; and the second leaf has two hooks formed on the second leaf to hook the round end of the first leaf.

6. The joint as claimed in claim 1, wherein the driving member has a semicircular actuating block and a central axle extending from the actuating block to serve as a center of the semicircular actuating block, wherein the central axle penetrates through the central hole in the second leaf and the axial hole in the first leaf; and the supporting base has two ends respectively corresponding to two ends of the actuating block.

7. The joint as claimed in claim 6, wherein the actuating block has a recess defined in the actuating block at a side facing the first leaf to receive a free end of the stub on the first leaf.

8. The joint as claimed in claim 6, wherein the supporting base is integrally formed on the actuating block.

* * * * *